US007837379B2

(12) United States Patent
Fiering et al.

(10) Patent No.: US 7,837,379 B2
(45) Date of Patent: Nov. 23, 2010

(54) DEVICES FOR PRODUCING A CONTINUOUSLY FLOWING CONCENTRATION GRADIENT IN LAMINAR FLOW

(75) Inventors: Jason O. Fiering, Boston, MA (US); Mathew Varghese, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 60 days.

(21) Appl. No.: 12/043,575

(22) Filed: Mar. 6, 2008

(65) Prior Publication Data
US 2009/0044619 A1 Feb. 19, 2009

Related U.S. Application Data

(60) Provisional application No. 60/955,581, filed on Aug. 13, 2007.

(51) Int. Cl.
*B01F 5/00* (2006.01)

(52) U.S. Cl. ............................. 366/181.5; 137/599.03; 366/337; 366/340; 366/341

(58) Field of Classification Search ................ 137/597, 137/599.03, 602; 366/181.5, 336, 337, 340, 366/341, DIG. 1
See application file for complete search history.

(56) References Cited

U.S. PATENT DOCUMENTS

| 1,583,051 | A | * | 5/1926 | Kennedy | 137/360 |
|---|---|---|---|---|---|
| 2,608,390 | A | * | 8/1952 | Huet | 165/173 |
| 3,127,738 | A | * | 4/1964 | Hasbrouck et al. | 137/334 |
| 3,128,794 | A | * | 4/1964 | Boucher et al. | 138/37 |
| 3,342,378 | A | * | 9/1967 | Mezoff et al. | 222/595 |
| 3,421,739 | A | * | 1/1969 | Alberts et al. | 366/134 |
| 3,470,912 | A | * | 10/1969 | Bydal | 138/37 |
| 3,506,244 | A | * | 4/1970 | Strang | 366/337 |
| 3,507,301 | A | * | 4/1970 | Larson | 137/602 |
| 3,510,240 | A | * | 5/1970 | Rhinehart | 431/350 |
| 3,847,773 | A | | 11/1974 | Snyder | |
| 3,852,013 | A | * | 12/1974 | Upmeier | 425/376.1 |
| 3,963,221 | A | * | 6/1976 | Yi | 366/341 |
| 4,214,610 | A | * | 7/1980 | James et al. | 137/597 |
| 4,222,671 | A | * | 9/1980 | Gilmore | 366/337 |
| 4,285,602 | A | * | 8/1981 | Hagerty et al. | 366/181.6 |

(Continued)

FOREIGN PATENT DOCUMENTS

DE 3624626 1/1988

(Continued)

OTHER PUBLICATIONS

Chen et al. "Topologic Mixing on a Microfluidic Chip" Applied Physics Letters, vol. 84, No. 12, Mar. 2004, pp. 2193-2195.

(Continued)

*Primary Examiner*—Tony G Soohoo
*Assistant Examiner*—Andrew Janca
(74) *Attorney, Agent, or Firm*—Goodwin Procter LLP (57) ABSTRACT

The invention generally relates to combining a plurality of flow streams. In various embodiments, a first channel transports a first laminar fluid flow, a second channel transports a second laminar fluid flow, and the first and second channels enter a merging region at an acute angle to one another along separate substantially parallel planes.

14 Claims, 8 Drawing Sheets

U.S. PATENT DOCUMENTS

| | | | |
|---|---|---|---|
| 4,426,344 A * | 1/1984 | Dinter et al. | 264/173.15 |
| 4,465,582 A | 8/1984 | Richman | |
| 4,473,300 A * | 9/1984 | Goins | 366/136 |
| 4,518,260 A * | 5/1985 | Goins | 366/134 |
| 4,553,849 A * | 11/1985 | Goins | 366/134 |
| 4,948,481 A | 8/1990 | Mullner | |
| 4,983,038 A * | 1/1991 | Ohki et al. | 356/246 |
| 5,094,788 A | 3/1992 | Schrenk | |
| 5,094,793 A * | 3/1992 | Schrenk et al. | 264/173.15 |
| 5,185,071 A | 2/1993 | Serwer et al. | |
| 5,250,188 A | 10/1993 | Bruening et al. | |
| 5,269,995 A * | 12/1993 | Ramanathan et al. | 264/173.12 |
| 5,275,706 A | 1/1994 | Weber | |
| 5,518,311 A * | 5/1996 | Althaus et al. | 366/181.5 |
| 5,531,831 A * | 7/1996 | Sweeney et al. | 118/600 |
| 5,620,714 A * | 4/1997 | Veen | 425/133.1 |
| 5,765,373 A * | 6/1998 | Bittle et al. | 60/313 |
| 5,780,067 A * | 7/1998 | Herrington, Jr. | 425/131.1 |
| 5,803,600 A * | 9/1998 | Schubert et al. | 366/144 |
| 5,816,045 A * | 10/1998 | Blocker et al. | 60/323 |
| 5,824,204 A | 10/1998 | Jerman | |
| 5,826,981 A * | 10/1998 | Fowler et al. | 366/337 |
| 5,904,424 A * | 5/1999 | Schwesinger et al. | 366/336 |
| 5,932,100 A | 8/1999 | Yager et al. | |
| 6,082,891 A * | 7/2000 | Schubert et al. | 366/338 |
| 6,136,171 A | 10/2000 | Frazier et al. | |
| 6,136,272 A * | 10/2000 | Weigl et al. | 422/82.05 |
| 6,143,152 A | 11/2000 | Simpson et al. | |
| 6,190,034 B1 * | 2/2001 | Nielsen et al. | 366/336 |
| 6,221,677 B1 | 4/2001 | Wu et al. | |
| 6,225,497 B1 * | 5/2001 | Becker et al. | 560/347 |
| 6,264,900 B1 * | 7/2001 | Schubert et al. | 422/224 |
| 6,299,657 B1 * | 10/2001 | Schubert et al. | 48/197 FM |
| 6,321,998 B1 * | 11/2001 | Schubert et al. | 239/8 |
| 6,328,868 B1 | 12/2001 | Weber | |
| 6,387,707 B1 | 5/2002 | Seul et al. | |
| 6,454,945 B1 | 9/2002 | Weigl et al. | |
| 6,467,503 B2 * | 10/2002 | Schlesch et al. | 137/597 |
| 6,479,734 B2 | 11/2002 | Iba et al. | |
| 6,623,860 B2 * | 9/2003 | Hu et al. | 428/411.1 |
| 6,676,835 B2 * | 1/2004 | O'Connor et al. | 210/542 |
| 6,692,627 B1 | 2/2004 | Russell et al. | |
| 6,695,147 B1 | 2/2004 | Yager et al. | |
| 6,705,357 B2 | 3/2004 | Jeon et al. | |
| 6,802,640 B2 * | 10/2004 | Schubert et al. | 366/181.6 |
| 6,845,787 B2 * | 1/2005 | Karp et al. | 137/833 |
| 6,851,846 B2 * | 2/2005 | Fujii et al. | 366/173.2 |
| 6,877,892 B2 * | 4/2005 | Karp | 366/341 |
| 6,890,093 B2 * | 5/2005 | Karp et al. | 366/336 |
| 6,905,324 B2 * | 6/2005 | Cloeren | 425/131.1 |
| 6,923,907 B2 * | 8/2005 | Hobbs et al. | 210/198.2 |
| 6,935,772 B2 | 8/2005 | Karp et al. | |
| 6,958,245 B2 | 10/2005 | Seul et al. | |
| 6,981,522 B2 * | 1/2006 | O'Connor et al. | 137/803 |
| 7,005,050 B2 | 2/2006 | Burns et al. | |
| 7,033,473 B2 | 4/2006 | Gascoyne et al. | |
| 7,056,746 B2 | 6/2006 | Seul et al. | |
| 7,077,906 B2 * | 7/2006 | Colombo et al. | 118/303 |
| 7,100,636 B2 * | 9/2006 | King | 137/597 |
| 7,135,144 B2 | 11/2006 | Christel et al. | |
| 7,261,812 B1 * | 8/2007 | Karp et al. | 210/198.2 |
| 7,316,503 B2 * | 1/2008 | Mathys et al. | 366/337 |
| 7,487,799 B2 * | 2/2009 | Wobben | 138/37 |
| 7,520,661 B1 * | 4/2009 | Lawson | 366/340 |
| 2002/0057627 A1 * | 5/2002 | Schubert et al. | 366/336 |
| 2002/0187503 A1 | 12/2002 | Harrold et al. | |
| 2003/0057092 A1 | 3/2003 | Chien et al. | |
| 2004/0182707 A1 | 9/2004 | Jardemark et al. | |
| 2004/0256230 A1 | 12/2004 | Yager et al. | |
| 2004/0257907 A1 * | 12/2004 | Xu et al. | 366/127 |
| 2005/0061669 A1 | 3/2005 | Woudenberg et al. | |
| 2005/0178701 A1 | 8/2005 | Roth et al. | |
| 2006/0025713 A1 | 2/2006 | Rosengart et al. | |
| 2008/0237044 A1 | 10/2008 | Fiering et al. | |
| 2009/0078614 A1 * | 3/2009 | Varghese et al. | 209/39 |
| 2009/0086572 A1 * | 4/2009 | Miyoshi et al. | 366/181.6 |

FOREIGN PATENT DOCUMENTS

| | | |
|---|---|---|
| DE | 3926466 | 2/1991 |
| DE | 19748481 | 5/1999 |
| EP | 0434556 | 6/1991 |
| EP | 1742057 | 1/2007 |
| WO | WO-96/26782 | 9/1996 |
| WO | WO-01/87458 | 11/2001 |
| WO | WO-2008/130618 | 10/2008 |

OTHER PUBLICATIONS

Fiering et al. "Continuous HIgh-Throughput Magnetic Separation of Pathogens from Blood" Micro-Fluidic Components and Systems, 0345. (2008).

Irmia et al. "Universal Microfluidic Gradient Generator" Anal. Chem. 2006, 78, pp. 3472-3477.

Ismagilov et al. "Pressure-Driven Laminar Flow in Tangenetial Microchannels: an Elastomeric Microfluidic Switch" Analytical Chemistry (2001).

Wang et al. "An Overlapping Crisscross Micromixer Using Chaotic Mixing Principles" J. Micromech. Microeng. 16 (2006) pp. 2684-2691.

Xia et al. "Chaotic Micromixers Using Two-Layer Crossing Channels to Exhibit Fast Mixing at Low Reynolds Numbers" Royal Society of Chemistry, Lab Chip 2005, 5, pp. 748-755.

International Search Report for International Application No. PCT/US2008/072438, mailed Aug. 6, 2009, 5 pages.

Written Opinion for International Application No. PCT/US2008/072438, mailed Aug. 6, 2009, 6 pages.

"Urine Concentration with Amicon Ultra Centrifugal Filters," [online]. Millipore Technical Library, 2005 [retrieved Aug. 23, 2007]. Retrieved from the Internet: <http://www.millipore.com/publications.nsf/docs/6djsf9>, 2 pages.

Albrecht et al. "Rapid Free Flow Isoelectric Focusing via Novel Electrode Structures," 9th Intl. Conf. on Miniaturized Systems for Chemistry and Life Sciences (MicroTAS), 2005, 3 pages.

Biscans et al. "Influence on Flow and Diffusion on Protein Separation in a Continuous Flow Electrophoresis Cell: Computation Procedure," Electrophoresis, vol. 9, 1988, pp. 84-89.

Blankenstein, "Microfabricated Flow System for Magnetic Cell and Particle Separation," Scientific and Clinical Applications of Magnetic Carriers, Plenum Press, 1997, pp. 233-245.

Chen, et al. "Magnetic Separation of Micro-Spheres From Viscous Biological Fluids," Phys. Med. Biol., vol. 52, 2007, pp. 1185-1196.

Chien, "Sample Stacking Revisited: A Personal Perspective," Electrophoresis, vol. 24, 2003, pp. 486-497.

Clifton et al. "Conditions for Purification Proteins by Free-Flow Zone Electrophoresis," Electrophoresis, vol. 11, 1990, pp. 913-919.

Dunn et al. "Abstract: Optimizing a Therapeutic Intervention: Systems Engineering of a Pheresis Intervention for Sepsis," J. of Critical Care, vol. 21, issue 4, Dec. 2006, pp. 360-361.

Edwards et al. "A Microfabricated Thermal Field-Flow Fractionation System," Anal. Chem. vol. 74, 2002, pp. 1211-1216.

Furdui et al. "Immunomagnetic T Cell Capture From Blood For PCR Analysis Using Microfluidic Systems," Lab On a Chip, vol. 4, 2004, pp. 614-618.

Gale et al. "A Micromachined Electrical Field-Flow Fractionation (m-EFFF) System," IEEE Transactions on Biomedical Engineering, vol. 45, issue 12, Dec. 1998, pp. 1459-1469.

Han et al. "Continuous Magnetophoretic Separation Of Blood Cells In Microdevice Format," J. of App. Physics. vol. 96, issue 10, Nov. 2004, pp. 5797-5802.

Han et al. "Microsystems for Isolation and Electrophysiological Analysis of Breast Cancer Cells From Blood," Biosensors and Bioelectronics, vol. 21, 2006, pp. 1907-1914.

Han et al. "Paramagnetic Capture Mode Magnetophoretic Microseparator for High Efficiency Blood Cell Separators," Lab On a Chip, vol. 6, No. 2, 2006, pp. 265-273.

Hoffman et al. "Continuous Free-Flow Electrophoresis Separation of Cytosolic Proteins From the Human Colon Carcinoma Cell Line LIM 1215: A Non Two-Dimensional Gel Electrophoresis-Based Proteome Analysis Strategy," Proteomics, vol. 1, 2001, pp. 807-818.

Hoffmann et al. "A Novel Repulsive-Mode High Gradient Magnetic Separator. Part 1. Design and Experimental Results," IEEE Transactions on Magnetics. vol. 40, issue 2, Mar. 2004, pp. 456-461.

Huang et al. "On-line Isotachophoretic Preconcentration and Gel Electrophoretic Separation of Sodium Dodecyl Sulfate-Proteins on a Microchip," Electrophoresis, vol. 26, issue 11, Apr. 25, 2005, pp. 2254-2260.

Huber et al. "Programmed Adsorption and Release of Proteins in a Microfluidic Device," Science, vol. 301, Jul. 18, 2003, pp. 352-354.

Inglis et al. "Continuous Microfluidic Immunomagnetic Cell Separation," App. Physics Letters. vol. 85, No. 21, Nov. 2004, pp. 5093-5095.

Ismagilov et al. "Experimental and Theoretical Scaling Laws for Transverse Diffusive Broadening in Two-Phase Laminar Flows in Microchannels," App. Phys. Lett., vol. 76, issue 17, 2000, pp. 2376-2378.

Jacobson et al. "Microchip Electrophoresis with Sample Stacking," Electrophoresis, vol. 16, issue 1, Apr. 13, 2005, pp. 481-486.

Janasek et al. "Electrostatic Induction of the Electric Field Into Free-Flow Electrophoresis Devices," Lab Chip, vol. 6, No. 6, Jun. 1, 2006, pp. 710-713.

Jung et al. "Thousandfold Signal Increase Using Field-Amplified Sample Stacking For On-Chip Eletrophoresis," Electrophoresis, vol. 24, 2003, pp. 3476-3483.

Kamholz et al. "Quantitative Analysis of Molecular Interaction in a Microfluidic Channel: The T-Sensor," Anal. Chem., vol. 71, issue 23, Oct. 28, 1999, pp. 5340-5347.

Kohlheyer et al. "Free-Flow Zone Electrophoresis and Isoelectric Focusing Using a Microfabricated Glass Device With Ion Permeable Membranes," Lab Chip, Jan. 26, 2006, vol. 6, No. 3, pp. 374-380.

Krivankova et al. "Continuous Free-Flow Electrophoresis," Electrophoresis, vol. 19, issue 7, Jun. 1998, pp. 1064-1074.

Lao et al. "Miniaturized Flow Fractionation Device Assisted by a Pulsed Electric Field for Nanoparticle Separation," Anal. Chem., vol. 74, issue 20, 2002, pp. 5364-5369.

Li et al. "Rapid and Sensitive Separation of Trace Level Protein Digests Using Microfabricated Devices Coupled to a Quadrupole Time-of-Flight Mass Spectrometer," Electrophoresis, vol. 21, 2000, pp. 198-210.

Lien et al. "Purification and Enrichment of Virus Samples Utilizing Magnetic Beads on a Microfluidic System," Lab on a Chip, vol. 7, issue 7, 2007, pp. 868-875.

Lund-Olesen et al. "Quantitative Characterization of Magnetic Separators: Comparison of Systems With and Without Integrated Microfluidic Mixers," Biomed Microdevices, vol. 9, 2007, pp. 195-205.

Osbourn et al. "On-Line Preconcentration Methods for Capillary Electrophoresis," Electrophoresis, vol. 21, issue 14, Aug. 24, 2000, pp. 2768-2779.

Pamme et al. "Continuous Sorting of Magnetic Cells via On-Chip Free-Flow Magnetophoresis," Lab On a Chip, vol. 6, 2006, pp. 974-980.

Pamme et al. "On-Chip Free-Flow Magnetophoresis: Continuous Flow Separation of Magnetic Particles and Agglomerates," Anal. Chem. vol. 76, issue 24, 2004, pp. 7250-7256.

Quirino et al. "Approaching a Million-Fold Sensitivity Increase in Capillary Electrophoresis with Direct Ultraviolet Detection: Cation-Selective Exhaustive Injection and Sweeping," Anal Chem., vol. 72, issue 5, Mar. 1, 2000, pp. 1023-1030.

Raymond et al. "Continuous Sample Preparation Using Free-Flow Electrophoresis on a Silicon Microstructure," Solid-State Sensors and Actuators, 1995 and Eurosensors IX.. Transducers '95, The 8th International Conference on, Jun. 25-29, 1995, vol. 1, pp. 760-763.

Raymond et al. "Continuous Sample Pretreatment Using a Free-Flow Electrophoresis Device Integrated onto a Silicon Chip," Anal. Chem., vol. 66, issue 18, Sep. 1994, pp. 2858-2865.

Reyes et al. "Micro Total Analysis Systems. 1. Introduction, Theory, And Technology," Anal. Chem., vol. 74, issue 12, Jun. 15, 2002, pp. 2623-2636.

Ross et al. "Microfluidic Temperature Gradient Focusing," Anal. Chem., vol. 74, 2002, pp. 2556-2564.

Song et al. "Continuous-Flow pI-Based Sorting of Proteins and Peptides in a Microfluidic Chip Using Diffusion Potential," Anal. Chem., vol. 78, issue 11, 2006, pp. 3528-3536.

Song et al. "Electrophoretic Concentration of Proteins at Laser-Patterned Nanoporous Membranes in Microchips," Anal. Chem., vol. 76, 2004, pp. 4589-4592.

Sun et al. "Continuous, Flow-Through Immunomagnetic Cell Sorting in a Quadrupole Field," Cytometry, vol. 33, 1998, pp. 469-475.

Takayasu et al. "Continuous Magnetic Separation of Blood Components from Whole Blood," IEEE Transactions on App. Superconductivity, vol. 10, No. 1, Mar. 2000, pp. 927-930.

Toner et al. "Blood-On-A-Chip," Annual Review of Biomedical Engineering, vol. 7, Aug. 2005, pp. 77-103.

Wainright et al. "Sample Pre-Concentration by Isotachophoresis in Microfluidic Devices," Journal of Chromatography A, vol. 979, 2002, pp. 69-80.

Wang et al. "Million-Fold Preconcentration of Proteins and Peptides by Nanofluidic Filter," Anal. Chem., vol. 77, 2005, pp. 4293-4299.

Wang et al. "Two-Dimensional Protein Separation with Advanced Sample and Buffer Isolation Using Microfluidic Valves," Anal. Chem., vol. 76, 2004, pp. 4426-4431.

Welte et al. "Structure of Function of the Proin Channel," Kidney International, vol. 48. 1995, pp. 930-940.

Xia et al. "Combined Microfluidic-Magnetic Separation of Living Cells in Continuous Flow," Biomed Microdevices, vol. 8, 2006, pp. 299-308.

Zhang et al. "High-Speed Free-Flow Electrophoresis on Chip," Anal. Chem. 75, 2003, pp. 5759-5766.

International Search Report for PCT Application No. PCT/US2008/003532, mailed Oct. 9, 2008, 3 pages.

Written Opinion for PCT Application No. PCT/US2008/003532, mailed Oct. 9, 2008, 4 pages.

International Search Report for PCT Application No. PCT/US2008/005002, mailed Oct. 8, 2008, 3 pages.

Written Opinion for PCT Application No. PCT/US2008/005002, mailed Oct. 8, 2008, 5 pages.

* cited by examiner

PRIOR ART

DEVICES FOR PRODUCING A CONTINUOUSLY FLOWING CONCENTRATION GRADIENT IN LAMINAR FLOW

CROSS-REFERENCE TO RELATED APPLICATIONS

This application claims priority to and the benefit of U.S. provisional patent Application No. 60/955,581, filed Aug. 13, 2007, the disclosure of which is hereby incorporated herein by reference in its entirety.

TECHNICAL FIELD

The invention generally relates to devices and techniques for use in microfluidics. More particularly, the invention relates to devices and methods for creating transverse concentration gradients of differing fluids in laminar flow channels.

BACKGROUND

In many applications of microfluidics it is desirable to create a concentration gradient transverse to the flow in a channel. The gradient may be used to efficiently optimize reactions and to eliminate the need for preparing a large number of individual dilutions. Examples of such uses are found in microfluidic systems for drug discovery, material science, and use with tissue cultures. A chemical gradient is also useful in separation methods, such as in isoelectric focusing, where molecules separate into zones each having a specific pH.

Because laminar flow typically prevails in microfluidic systems, mixing is difficult to achieve. Therefore special techniques are needed to achieve mixtures of two input fluids. A number of gradient generators in microfluidic formats are known in the art. These typically involve complicated networks and microstructures designed to divide and mix streams in laminar flow, thereby converting two input concentrations into an output stream with a transverse concentration gradient. These devices generally require intricate micromachining and comparatively long lengths on the order of several centimeters. These devices are, therefore, typically expensive to manufacture and limited to applications where long channel lengths are acceptable.

As a result, there is a need for a flow gradient-generation device that may be used to create transverse concentration gradients of differing fluids in laminar flow channels of limited channel length.

SUMMARY OF THE INVENTION

The present invention generally relates to systems and methods for providing a transverse flow gradient in a laminar flow channel using a short channel length. In one embodiment of the invention, rather than dividing flow streams and recombining them, a device mixes two flow streams in varying proportions by intersecting the flow streams in two adjacent planes.

One aspect of the invention features a device for combining a plurality of flow streams. Embodiments of the device include a first channel for transporting a first laminar fluid flow, a second channel for transporting a second laminar fluid flow, a merging region, and a merged downstream channel. In one embodiment, the first and second channels enter the merging region at an acute angle to one another along separate substantially parallel planes.

In one embodiment, the merging region generates a sigmoidal interface between two merged fluid flows in the merged downstream channel. At least one of the channels may be manufactured from (i.e. comprise or consist essentially of) a silicone, a metal, a plastic, a composite material, a glass, and/or combinations thereof. At least one of the channels may be manufactured by polymer molding.

In one embodiment, the first and second channels each include a substantially equal cross-sectional area. The merged downstream channel may include a cross-sectional area substantially equal to a combined cross-sectional area of the first and second channels. The device may also include a third channel for transporting a third laminar fluid flow, the third channel entering the merging region at an acute angle to at least one of the first and second channels along a separate plane.

In one embodiment, the device includes a plurality of substream channels extending from the merged downstream channel. At least two of the plurality of the substream channels may extend outward within a single plane.

In one embodiment, the plurality of the substream channels includes a first substream channel for transporting a first downstream laminar fluid flow, a second substream channel for transporting a second downstream laminar fluid flow, and a diverging region. The first and second substream channels may exit the diverging region at an acute angle to one another along separate, substantially parallel, planes. At least one of the substream channels may include a mixing device.

In one embodiment, the device includes a plurality of merging regions and diverging regions positioned in series along a fluid flow path. The plurality of substream channels enter a second merging region at an acute angle to one another. The second merging region may generate a substantially smooth concentration gradient between the first laminar fluid flow and the second laminar fluid flow.

Another aspect of the invention features a method of merging two laminar fluid flows. Embodiments of the method include the steps of transporting a first laminar fluid flow in a first channel, transporting a second laminar fluid flow in a second channel, and merging the first laminar fluid flow and the second laminar fluid flow at an acute angle along separate substantially parallel planes. The merged fluid flow may include an interface between the first laminar fluid flow and the second laminar fluid flow. In one embodiment, at least one of the first and second laminar fluid flows has a flow rate ranging from approximately 10 to 1000 microliters/minute.

In one embodiment, the interface is substantially sigmoidal. A cross-sectional area of the merged fluid flow may be substantially equal to a combined cross-sectional area of the first and second laminar fluid flows.

The method may further include the step of diverging the merged fluid flow into a plurality of substreams. At least two of these substreams may be merged to produce a second merged flow stream. The second merged flow stream may include a substantially smooth concentration gradient between the first laminar fluid flow and the second laminar fluid flow. At least one of the substreams may be mixed to produce a substantially uniformly mixed flow.

Another aspect of the invention features a method of mixing two laminar fluid flows. Embodiments of the method include the steps of transporting a first laminar fluid flow in a first channel, transporting a second laminar fluid flow in a second channel, and repeatedly merging and diverging the first and second laminar fluid flows at an acute angle along separate substantially parallel planes to produce a mixed downstream fluid flow. The mixed downstream fluid flow may be substantially uniformly mixed, or have a substantially smooth concentration gradient.

Another aspect of the invention features an apparatus for mixing two laminar fluid flows. Embodiments of the apparatus include a means for transporting a first laminar fluid flow and a means for transporting a second laminar fluid flow. Embodiments of the apparatus may also include a means for repeatedly merging and diverging the first and second laminar fluid flows at an acute angle along separate substantially parallel planes to produce a mixed downstream fluid flow.

These and other objects, along with advantages and features of the present invention, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

In various embodiments, the present invention relates to systems and methods for forming an interface, such as a sigmoidal or other appropriate shape of interface, between two intersecting laminar flow streams in a microfluidic channel.

In one embodiment, the invention provides two streams of fluid in laminar flow, each confined in one or more microchannels. Any appropriate fluid may be confined in the channels, including, but not limited to, an aqueous solution, blood, a medical solution such as dextran, or any other appropriate solution for use in medical, chemical, and/or engineering applications.

Figure 6:
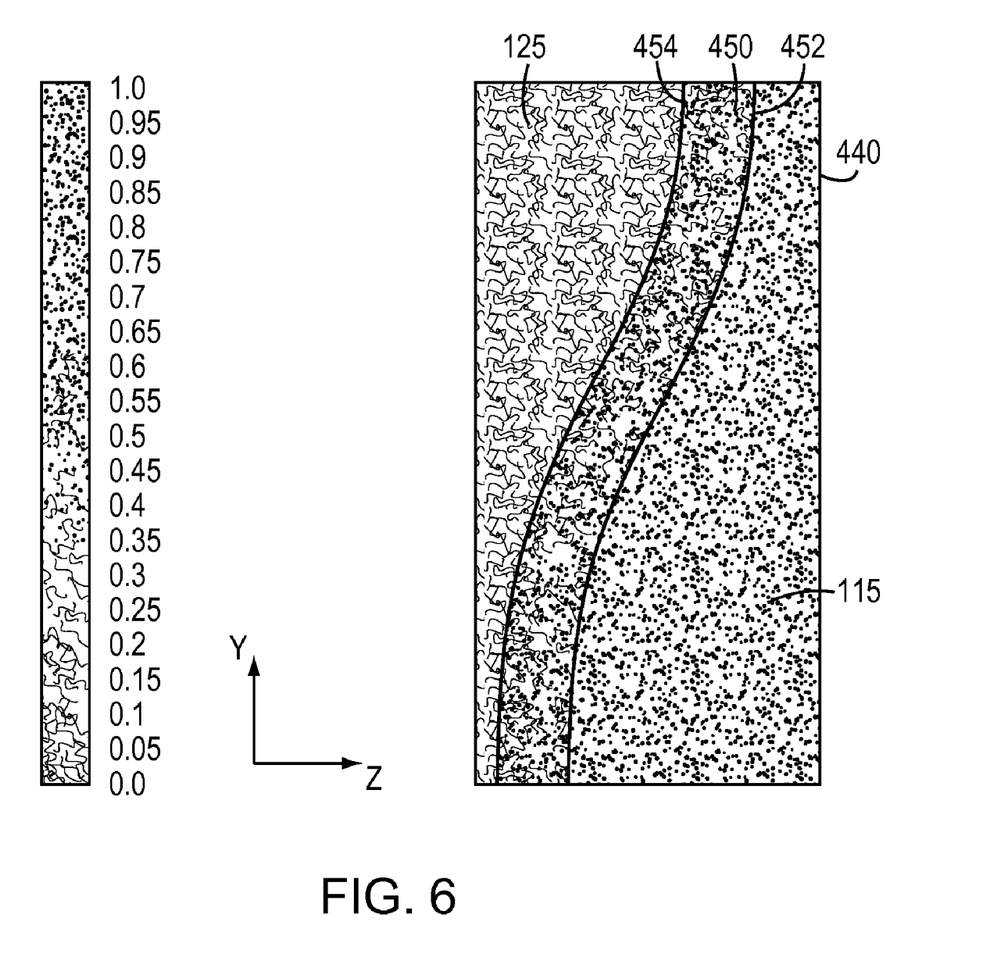
FIG. 6 is a schematic sectional view, perpendicular to the direction of flow of a sigmoidal interface between two intersecting flow streams downstream of the merging of two channels resulting from the finite element model in represented in FIG. 5, in accordance with one embodiment of the invention.

In one embodiment, input streams in two fluid channels are merged together at an acute angle to form a merged stream in a single channel downstream of the merging region. More specifically, the two channels are merged at an acute angle with one channel positioned in a substantially parallel plane above, or to the side of, the plane of the other channel before the merging region. The merged stream has a width equal to that of each of the two input streams and a height equal to the sum of the height of the two input streams, so that the net cross sectional area of the streams is unchanged. In one embodiment of the invention, the interface of the two merged fluids (neglecting diffusion) has a sigmoidal shape. An example of a sigmoidally shaped interface is depicted in FIG. 6.

In one embodiment, this merged stream is then divided into an arbitrary number of channels. For example, the stream may be divided into 'n' discrete subchannels, each with a height equal to that of the merged stream, but with a width of 1/n. Each of these sub-channels then has an average concentration that represents a monotonically varying ratio of the two input concentrations. If uniform mixing is needed in each sub-channel, these sub-channels may be subsequently mixed using conventional microfluidic methods as required by the application.

Varying the channel geometry, angle of merging, channel size, flow rate, and/or fluid material may result in interface boundaries between the two fluids downstream of the merging region of differing shapes, such as, but not limited to, sigmoidal interfaces, flat interfaces, and angled interface regions. In an alternative embodiment, a greater number of flow channels merge at a single merging region, resulting in a plurality of interfaces between two or more fluids.

Merging fluid flows in accordance with this embodiment of the invention has a number of advantages over prior methods. For example, the present invention permits significantly shorter channel lengths and geometries that are more easily manufactured, which significantly reduces manufacturing costs and allows for gradient generators of significantly smaller volumes.

Figure 11:
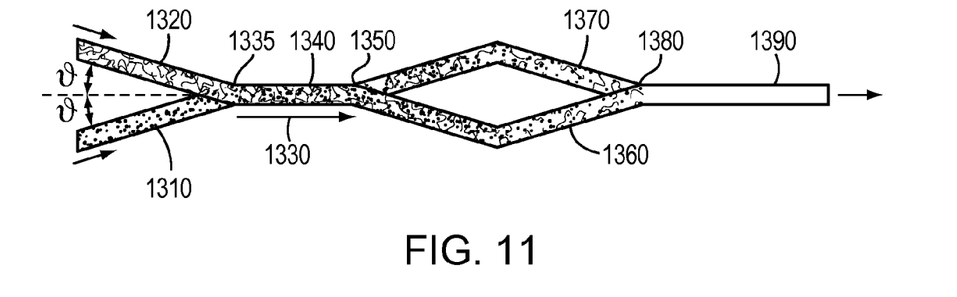
FIG. 11 is a schematic plan view of a mixing device including a plurality of merging and dividing flow channels, in accordance with one embodiment of the invention.

In accordance with the invention, other mixing applications using similar merging streams may be employed, such as, but not limited to, laminar flow mixers. An example mixer that works with two fluids as described above, splitting the resulting downstream flow at a point 1350 into two separate flows and merging at point 1380 these two flows together again, is depicted in FIG. 11, which is described further below.

Another embodiment of the invention includes a gradient generator for splitting a sigmoidal interface flow stream into a plurality of substreams. An example gradient generator, which is described further below, is depicted in FIGS. 12A to 12E. In this embodiment, a stream including two fluids bounding each other along a sigmoidal interface is divided at point 1450 along a single longitudinal plane into a plurality of substreams 1460, 1470, 1480. By splitting the fluid into a number of substreams 1460, 1470, 1480, the average concentration in each substream 1460, 1470, 1480 varies monotonically from one to the next, as depicted in FIG. 12D. Each of these substreams 1460, 1470, 1480 may thus provide a specific ratio of the two input fluids 1415, 1425.

Figure 12A:
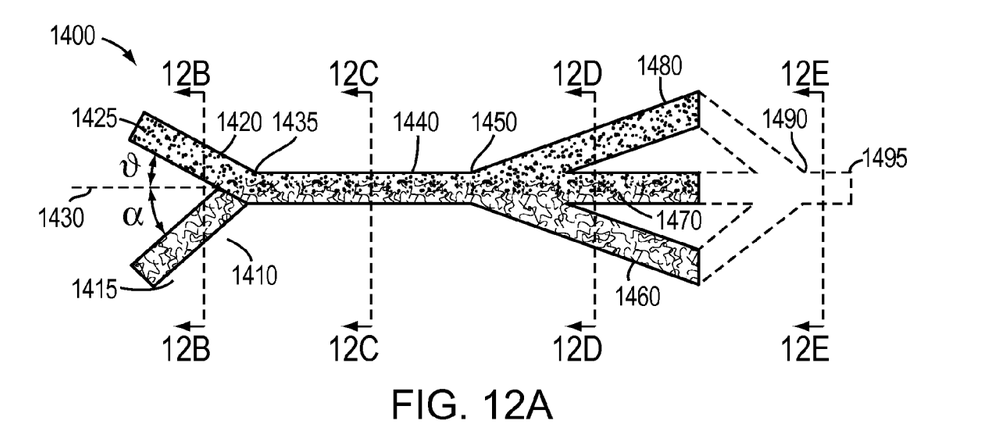
FIG. 12A is a schematic plan view of a gradient generator for splitting a sigmoidal interface flow stream into a plurality of substreams, in accordance with one embodiment of the invention.
Figure 12B:
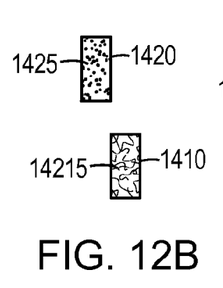
FIG. 12B is a schematic sectional view of the device of FIG. 12A through the section A-A.
Figure 12C:
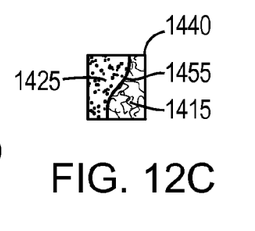
FIG. 12C is a schematic sectional view of the device of FIG. 12A through the section B-B.
Figure 12D:
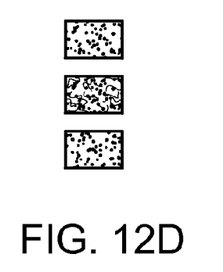
FIG. 12D is a schematic sectional view of the device of FIG. 12A through the section C-C.
Figure 12E:
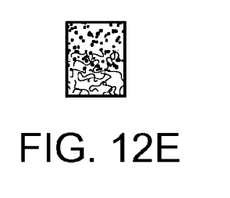
FIG. 12E is a schematic sectional view of the device of FIG. 12A through the section D-D.

In one embodiment, the substreams 1460, 1470, 1480 are merged back together at a downstream merging location 1490 to give a smooth mixing gradient between the two fluids laterally across the final stream 1495, as depicted in FIG. 12E. Mixing devices may be placed within the substreams 1460, 1470, 1480 to facilitate mixing of the two or more fluids within each substream.

These latter two embodiments of the invention (depicted in FIGS. 11 and 12A to 12E) have a number of significant advantages, including the use of merging in two planes to generate a sigmoidal interface between two fluids, the dividing of this sigmoidal interface to capture varying discrete output concentrations, and the creation of a laminar flow mixer consisting of two superposed merging and dividing streams.

The invention also has a number of commercial applications, including microfluidic systems for diagnostics, drug discovery, tissue cultures, cell biology research, chemical reactors, and/or materials synthesis.

Figure 1A:
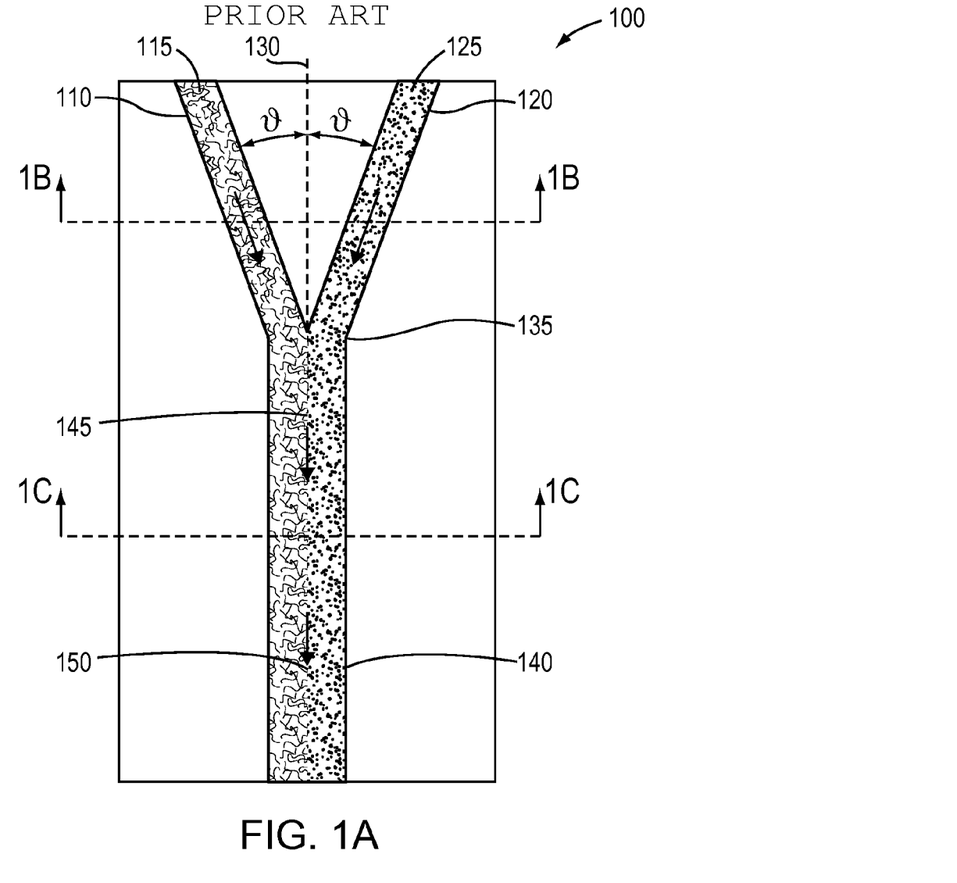
FIG. 1A is a schematic plan view of a prior art device for forming an interface between two intersecting flow streams.
Figure 1B:
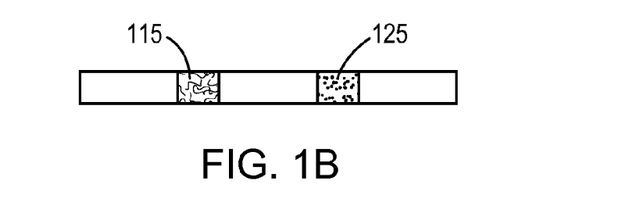
FIG. 1B is a schematic sectional view of the device of FIG. 1A through the section A-A.
Figure 1C:
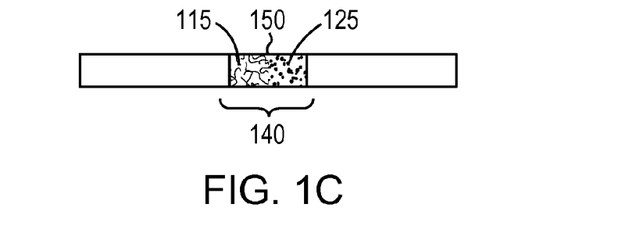
FIG. 1C is a schematic sectional view of the device of FIG. 1A through the section B-B.

An example prior art device 100 for merging two flow streams is shown in FIGS. 1A to 1C. In this embodiment, the device 100 includes a first channel 110 carrying a first fluid 115 and a second channel 120 carrying a second fluid 125. The first channel 110 and second channel 120 lie within a single plane, and each extend at an angle θ to a central longitudinal axis 130 of the device 100. The first channel 110 and second channel 120 merge into a single merged downstream channel 140 at a merging region 135, with the merged downstream channel 140 extending within the plane of the first channel 110 and second channel 120 along the direction of the longitudinal axis 130.

In the device of FIGS. 1A to 1C, the merging region 135 merges the first fluid 115 and the second fluid 125 together into a single downstream flow 145 including both the first fluid 115 and the second fluid 125. Cross-sections of the flow at a section A-A (upstream of the merging region 135) and a section B-B (downstream of the merging region 135) are shown in FIGS. 1B and 1C, respectively.

The first channel 110, the second channel 120, and the merged downstream channel 140 may be configured to produce a laminar flow therein. By maintaining a laminar fluid flow in each of the first channel 110, the second channel 120, and the merged downstream channel 140, the first fluid 115 and the second fluid 125 will undergo minimal mixing upon entering the merging region 135. As a result, a cross-section of the fluid flow in the downstream merged channel 140 will include a separate region of each of the first fluid 115 and the second fluid 125, with a vertical fluid interface 150 therebetween, with the shape of the regions of the first fluid 115 and the second fluid 125 substantially corresponding to the cross-sectional shape of the first channel 110 and second channel 120 upstream of the merging region 135, respectively. The fluid interface 150 defines the boundary between the first fluid 115 and second fluid 125.

Another prior art device for merging two flow streams is shown in FIGS. 2A to 2D. This device 200 includes a first channel 210 carrying a first fluid 115 and a second channel 220 carrying a second fluid 125. The first channel 210 and second channel 220 lie within two separate, substantially parallel planes. For example, as illustrated, the first channel 210 lies in a plane above the plane in which the second channel 220 lies. The first channel 210 and second channel 220 each extend at an angle θ to a central longitudinal axis 230.

Figure 2A:
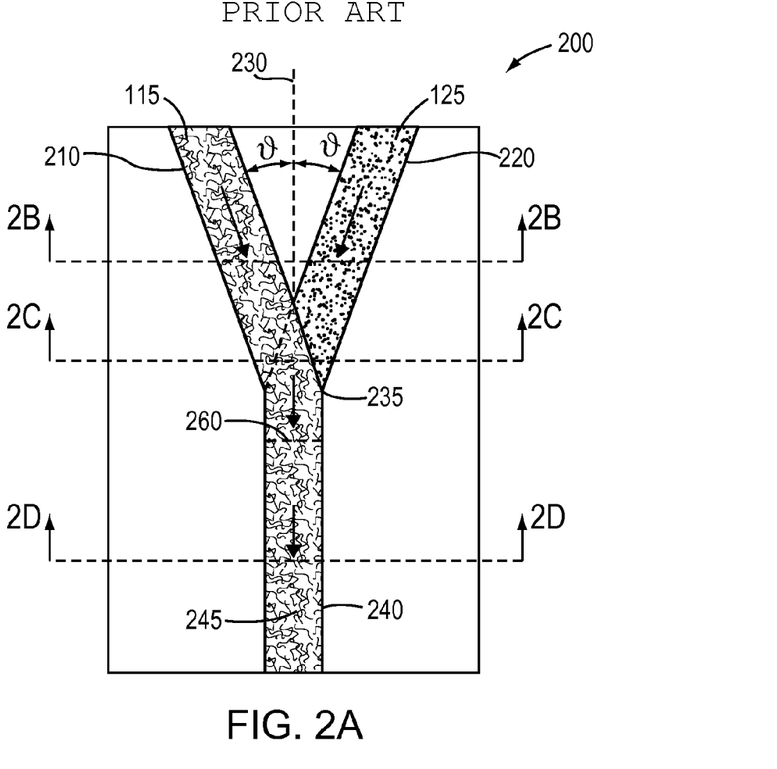
FIG. 2A is a schematic plan view of another prior art device for forming an interface between two intersecting flow streams.

The first channel 210 and second channel 220 merge into a single merged downstream channel 240 at a merging region 235, with the merged downstream channel 240 extending along the direction of the longitudinal axis 230.

Figure 2B:
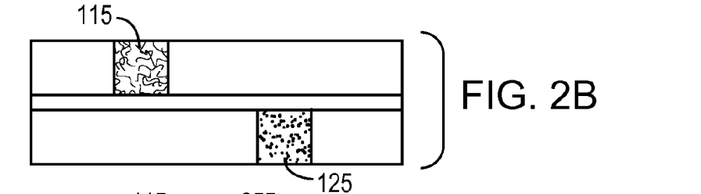
FIG. 2B is a schematic sectional view of the device of FIG. 2A through the section A-A.
Figure 2C:
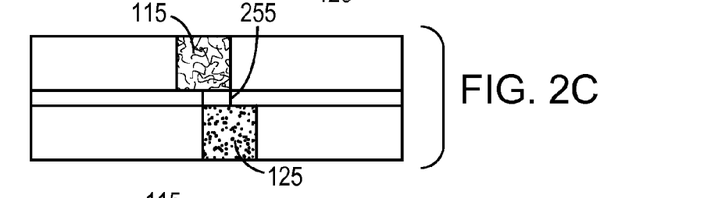
FIG. 2C is a schematic sectional view of the device of FIG. 2A through the section B-B.
Figure 2D:
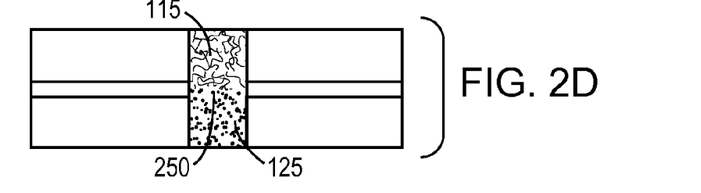
FIG. 2D is a schematic sectional view of the device of FIG. 2A through the section C-C.

In the device of FIGS. 2A to 2D, the merging region 235 merges the first fluid 115 and the second fluid 125 together into a single downstream flow 245 including both the first fluid 115 and the second fluid 125. Cross-sections of the flow at a section A-A (upstream of the merging region 235), a section B-B (within the merging region 235), and a section C-C (downstream of the merging region 235), are shown in FIGS. 2B, 2C, and 2D respectively.

Again, the first channel 210, the second channel 220, and the merged downstream channel 240 may produce a laminar flow therein. By maintaining a laminar fluid flow in each of the first channel 210, the second channel 220, and the merged downstream channel 240, the first fluid 115 and the second fluid 125 will undergo minimal mixing upon entering the merging region 235. As a result, a cross-section of the fluid flow in the downstream merged channel 140 will include a separate region of each of the first fluid 115 and the second fluid 125, with a horizontal fluid interface 250 therebetween.

In this embodiment, the first channel 210 and the second channel 220 enter the merging region 235 at an angle θ to a central longitudinal axis 230, with the first channel 210 extending along a plane directly above, and parallel to, a plane of the second channel 220. The relative location of each channel upstream of the merging region 235 is shown in FIG. 2B. The merging region 235 includes a boundary wall 255 dividing the first channel 210 and the second channel 220 and preventing mixing of the first fluid 115 and second fluid 125 until after both the first channel 210 and the second channel 220 have converged in the merging region 235 and are each traveling in a single direction along the central longitudinal axis 230, as illustrated in FIG. 2C.

Once the flow directions of the first channel 210 and the second channel 220 have converged within the merging region 235, the boundary wall 255 between the first channel 210 and the second channel 220 ends, thus allowing the first fluid 115 and the second fluid 125 to come into contact with each other along a fluid interface 250, as illustrated in FIG. 2D. The end of the boundary wall 255 is at a merging location 260. As a result, the downstream fluid flow 245 will include separate, distinct, regions of the first fluid 115 and the second fluid 125, with a horizontal fluid interface 250 therebetween, and with the shape of the regions of the first fluid 115 and the second fluid 125 substantially corresponding to the cross-sectional shape of the first channel 210 and second channel 220 upstream of the merging location 260, respectively.

One embodiment of the invention is shown in FIGS. 3A to 3D. In this embodiment, a device 300 includes a first channel 310 carrying a first fluid 115 and a second channel 320 carrying a second fluid 125. The first fluid 115 and second fluid 125 may each include an aqueous solution, blood, a medical solution such as dextran, or any other appropriate solution for use in medical, chemical, and/or engineering applications.

Figure 3A:
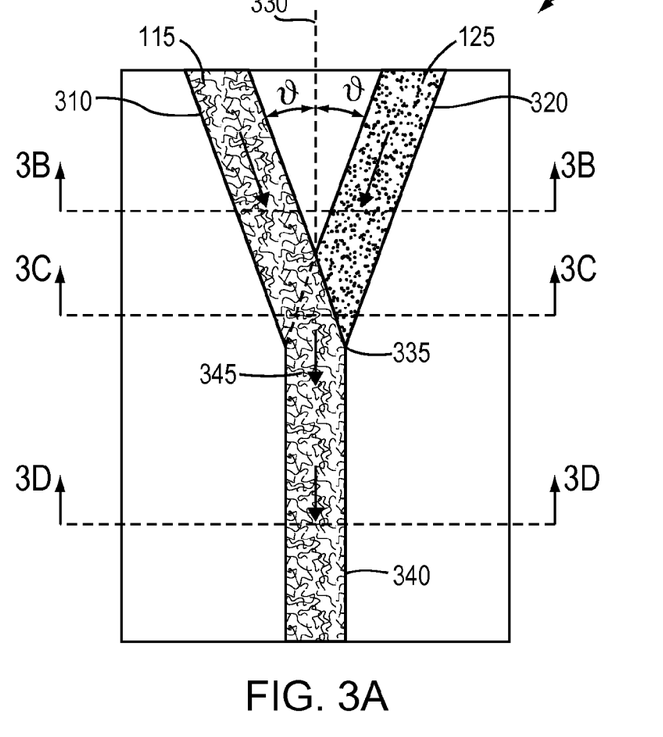
FIG. 3A is a schematic plan view of a device for merging two intersecting flow streams along separate substantially parallel adjacent planes, in accordance with one embodiment of the invention.

The first channel 310 and second channel 320 lie within two separate, substantially parallel planes. For example, as illustrated, the first channel 310 lies in a plane above the plane in which the second channel 230 lies. The first channel 310 and second channel 320 each extend at an angle θ to a central longitudinal axis 330.

In this embodiment, the first channel 310 and second channel 320 merge into a single merged downstream channel 340 at a merging region 335, with the merged downstream channel 340 extending along the direction of the longitudinal axis 330. In one embodiment, the merged downstream channel 340 has a height of twice that of each of the first channel 310 and second channel 320, and a width equal to that of each of the first channel 310 and second channel 320 (i.e. the height of the merged downstream channel 340 is substantially equal to that of the combined height of the first channel 310 and second channel 320, while all three channels 310, 320, 340 have substantially the same width). Alternatively, the cross-sectional area and/or shape of each of the first channel 310, second channel 320, and merged downstream channel 340, and the ratios therebetween, may be configured to any of the shapes and ratios described herein. For example, the height and/or width of the first channel 310 and second channel 320 may be the same or different. Moreover, at least one of the channels 310, 320 may have a height substantially equal to its width, or have a height that is greater than, or smaller than, its width.

In one embodiment of the invention, the cross-sectional area of the merged downstream channel 340 is equal to the combined cross-sectional area of the first channel 310 and second channel 320. In an alternative embodiment, the cross sectional area of the merged downstream channel 340 is greater than, or less than, the combined cross sectional area of the first channel 310 and second channel 320.

In one embodiment, the first channel 310, the second channel 320, and the merged downstream channel 340 are formed within one or more layers of a suitable material, such as by polymer molding, etching, or other appropriate method. In an alternative embodiment, at least one of the first channel 310, the second channel 320, and the merged downstream channel 340 is formed from a hollow elongate tube.

In one embodiment, at least one of the first channel 310, second channel 320, and the downstream channel 340 has a square cross-section. Alternatively, one or more of the channels 310, 320, 340 may have a rectangular cross-section, a circular cross-section, an oval cross-section, or another appropriately shaped cross-section.

Figure 3B:
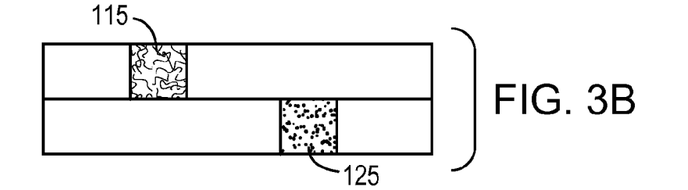
FIG. 3B is a schematic sectional view of the device of FIG. 3A through the section D-D.
Figure 3C:
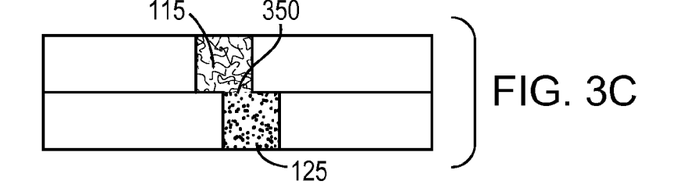
FIG. 3C is a schematic sectional view of the device of FIG. 3A through the section E-E.
Figure 3D:
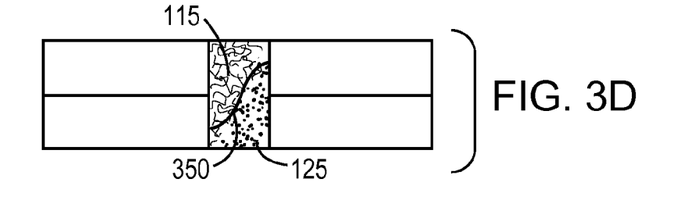
FIG. 3D is a schematic sectional view of the device of FIG. 3A through the section F-F.

In the embodiment depicted in FIGS. 3A to 3D, the merging region 335 merges the first fluid 115 and the second fluid 125 together into a single downstream flow 345 including both the first fluid 115 and the second fluid 125. Cross-sections of the flow at a section D-D (upstream of the merging region 335), a section E-E (within the merging region 335), and a section F-F (downstream of the merging region 335), are shown in FIGS. 3B, 3C, and 3D, respectively.

The first channel 310, the second channel 320, and the merged downstream channel 340 are configured to produce a laminar flow therein. This may be achieved through appropriate selection of the cross-sectional area of the channels, the shape of the channels, the velocity of the fluid with each channel, the Reynolds Number (Re) of the fluid flow in each channel, and the properties of the fluids carried within the channels themselves. By maintaining a laminar fluid flow in each of the first channel 310, the second channel 320, and the merged downstream channel 340, the first fluid 115 and the second fluid 125 will undergo minimal mixing upon entering the merging region 335. As a result, a cross-section of the fluid flow in the downstream merged channel 340 will include a separate region of each of the first fluid 115 and the second fluid 125, with a fluid interface 350 therebetween. The thickness of the fluid interface region 350 may be dependent upon factors such as, but not limited to, the properties of each of the first fluid 115 and second fluid 125, the Reynolds number for each fluid flow, and the configuration of the merging region 335.

The device 300 is configured without a boundary wall dividing the first fluid 115 and the second fluid 125 at the entrance of the merging region 335. As a result, the bottom surface of the first fluid 115 immediately comes into contact with the upper surface of the second fluid 125 as it enters the merging region 335, thus creating the fluid interface 350.

In this embodiment, the first fluid 115 and the second fluid 125 interact with each other while still traveling at an angle θ to the central longitudinal axis 330, resulting in an angle 2θ between the flow directions of the two fluids. As a result, shear forces are created between the contacting surfaces of the two fluids within the merging region 335, resulting in a distortion of the fluid interface 350. This in turn produces a single downstream flow 345 in the merged downstream channel 340 with a distorted fluid interface 350 between the first fluid 115 and the second fluid 125, rather than the flat fluid interface of the embodiments depicted in FIGS. 1A though 2D.

The angle θ between the first channel 310 (or second channel 320) and the central longitudinal axis 330 may be set at any appropriate angle. For example, the angle θ may range from 0° to 45°, or from 5° to 30°. In one embodiment, the angles between the first channel 310 and the central longitudinal axis 330 and between the second channel 320 and the central longitudinal axis 330 are the same. In an alternative embodiment, the angles between the first channel 310 and the central longitudinal axis 330 and between the second channel 320 and the central longitudinal axis 330 are different.

In one embodiment, the first channel 310, the second channel 320, and the downstream merged channel 340 are straight channels extending outwards from the merging region 335. In an alternative embodiment, at least one of the first channel 310, the second channel 320, and the downstream merged channel 340 includes at least one curved section. This curved section may be situated away from the merging region 335 or be situated proximate the merging region 335. In one embodiment, angle θ between the first channel 310 (or second channel 320) and the central longitudinal axis 330 may be adjustable.

In one embodiment of the invention, the interactions of the boundaries of the two fluids within the merging region 335 results in a substantially sigmoidally shaped fluid interface 350. The specific shape of this sigmoidal fluid interface 350 may be controlled by factors including, but not limited to, the angle at which each of the first channel 310 and the second channel 320 enter the merging region 335, the velocity of each fluid at the entrance to the merging region 335, the fluid properties of each fluid, and the cross-sectional shape and/or area of each of the first channel 310, the second channel 320, and the merged downstream channel 340. By careful selection of these properties, the shape of the fluid interface 350 downstream of the merging region 335 (i.e. in the merged downstream channel 340), and the resulting fluid distribution within the merged downstream channel 340, may be controlled. As the single downstream flow 345 within the merged downstream channel 340 remains laminar, the first fluid 115 and the second fluid 125 will undergo minimal mixing and, as a result, the fluid interface 350 will maintain its shape within the single downstream flow 345.

In alternative embodiments of the invention, the merging region 335 may be configured to produce other shapes of fluid interfaces between the first fluid 115 and the second fluid 125 downstream of the merging region 335.

Figure 4:
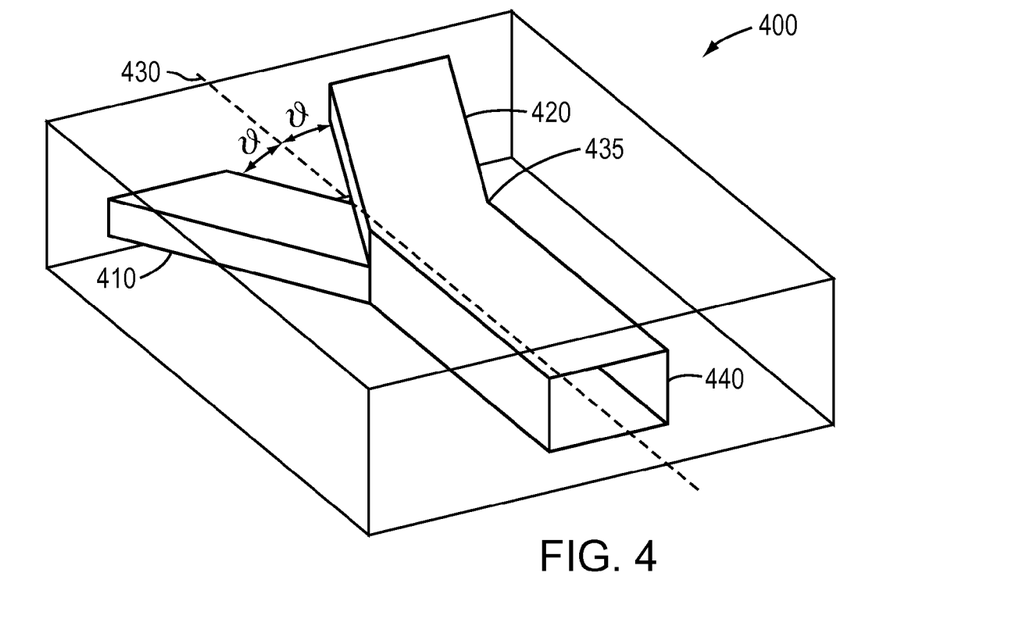
FIG. 4 is a schematic perspective view of a specific embodiment of the device of FIG. 3A.

A specific embodiment of a device for creating a substantially sigmoidally shaped fluid interface between two fluids is illustrated in FIG. 4. In this embodiment, the device 400 includes a rectangularly shaped first channel 410 and second channel 420 lying within two separate, substantially parallel planes. These channels 410, 420 enter a merging region 435 at an angle θ to a central longitudinal axis 430. The channels, and the flows within these channels, are combined within the merging region 435 into a single merged downstream channel 440 and flow.

In this embodiment, the first channel 410 and second channel 420 each have the same width and height, and therefore the same cross-sectional area. The merged downstream channel 440, has the same width as each of the first channel 410 and second channel 420, and has a height equal to the combined height of the first channel 410 and second channel 420, and therefore has a cross-sectional area equal to the combined cross-sectional area of the first channel 410 and second channel 420.

Figure 5:
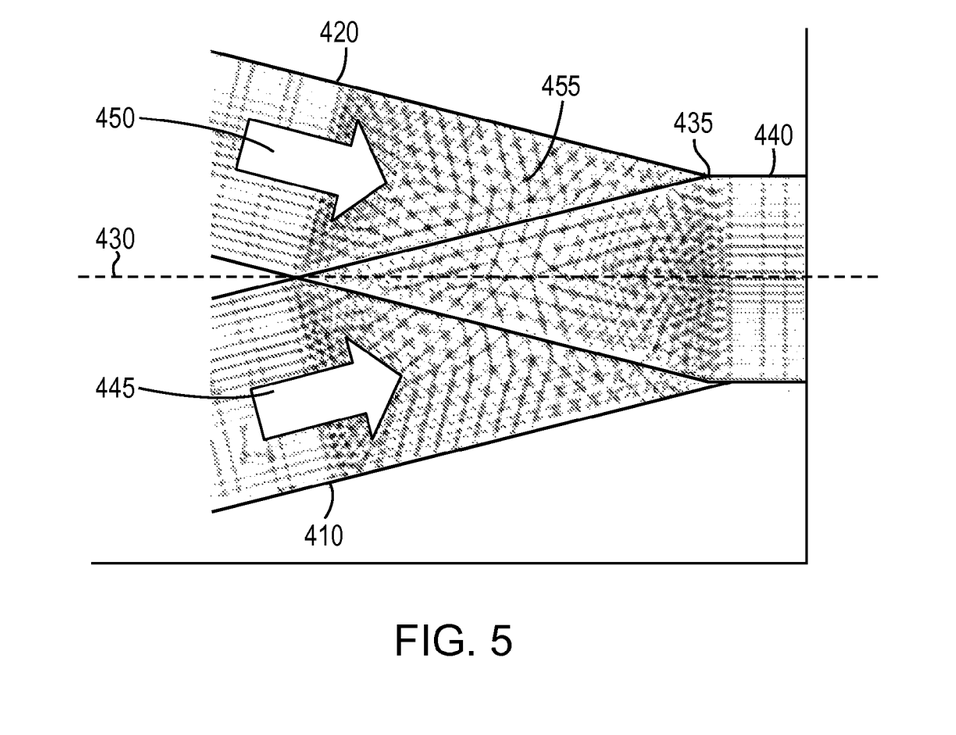
FIG. 5 is a schematic plan view of a finite element model for predicting the flow at the intersection of two flow streams, in accordance with one embodiment of the invention.

A plan view of the merging region 435 of the device 400 is shown in FIG. 5. As shown, a first fluid enters the merging region 435 through the first channel 410 along a first direction 445, while a second fluid enters the merging region 435 through the second channel 420 along a second direction 450. Once merged, the resulting single downstream flow will travel downstream within the merged downstream channel 440 along a direction corresponding to the central longitudinal axis 430. FIG. 5 also illustrates an example mesh 455 of a finite element model for predicting the flow at the merging region 435.

As before, each of the first channel 410, second channel 420, and merged downstream channel 440 are configured to provide a laminar flow therein. As a result, the fluids within the first channel 410 and second channel 420 will undergo minimal mixing within the merging region 435, resulting in a downstream fluid flow that includes a first region with substantially only the first fluid, a second region with substantially only the second fluid, and an interface region therebetween.

A contour plot showing the concentration distribution for a first fluid 115 and a second fluid 125 in the cross section of the merged downstream channel 440 is shown in FIG. 6. This contour plot was calculated using finite element analysis, applying the mesh 455. The contour plot shows the formation of a substantially sigmoidal interface region 450 between a region comprising substantially only the first fluid 115 and a region comprising substantially only the second fluid 125.

The fluid interface 450 defines the boundary between the first fluid 115 and second fluid 125, and includes a relatively thin fluid region in which some diffusion between the two fluids takes place, resulting in a fluid concentration gradient for each fluid that varies over the thickness of the fluid interface 450. The amount of mixing between the two fluids and the resulting thickness of the fluid interface 450 may depend upon factors including, but not limited to, the properties of each fluid, the geometry of the merging region, the angles of each of the first channel 410 and the second channel 420 relative to the central longitudinal axis 430, and the Reynolds number of each fluid flow.

The sigmoidal shape of the fluid interface 450 is created by the shear stresses formed at the boundary between the first fluid 115 and the second fluid 125 as the fluids meet, at an angle to each other, within the merging region 435. These shear stresses produce forces on each fluid that deform the cross-sectional profile of each fluid and push the fluids into the cross-sectional configuration shown in FIG. 6. As the fluid flow remains laminar within the merged downstream channel 440, the merged fluid flow will continue downstream with this cross-sectional fluid distribution for a significant distance, with limited additional mixing between the two fluids.

Figure 7:
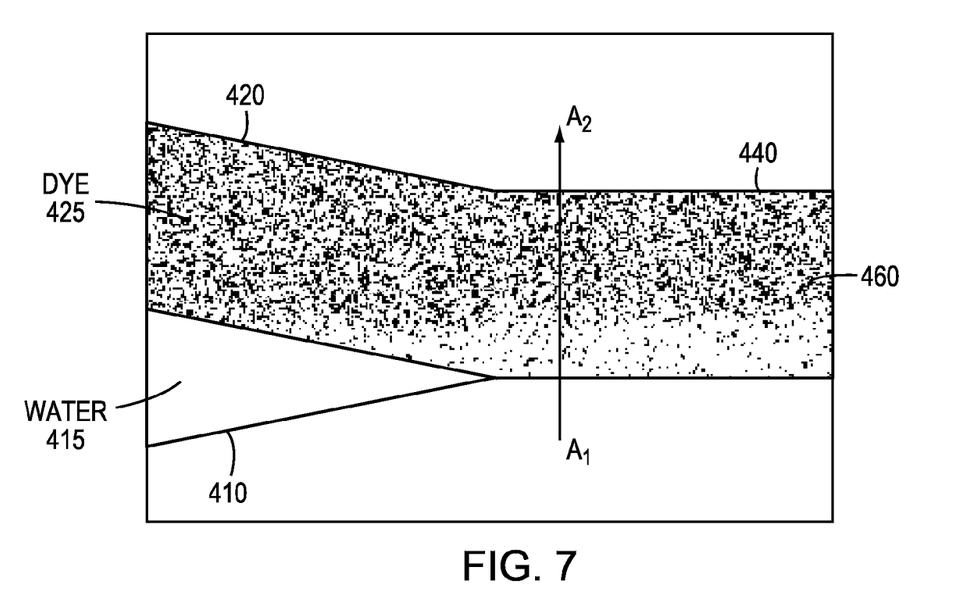
FIG. 7 is a schematic plan view of an intersection of a clear water flow stream with a dyed water flow stream, in accordance with one embodiment of the invention.
Figure 8:
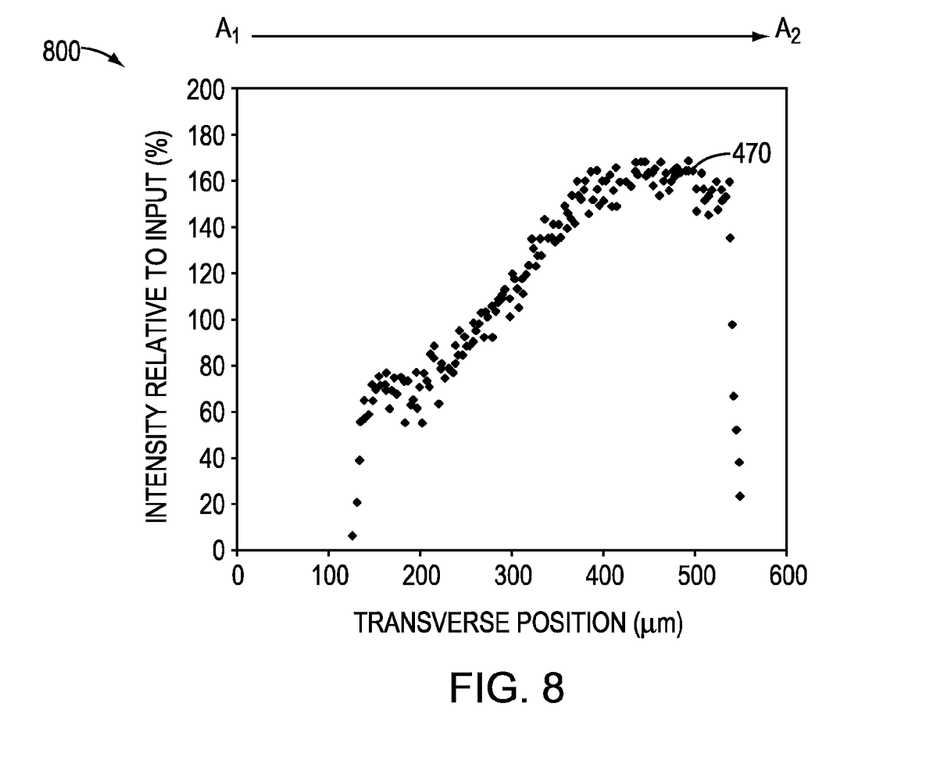
FIG. 8 is a graph of dye concentration, summed through the depth of the channel, with respect to transverse position through the section $A_1$-$A_2$ of the flow intersection of FIG. 7.

Experimental results for an embodiment of the invention employing the device 400 are illustrated in FIGS. 7 and 8. In this embodiment, the first channel 410 is carrying clear water 415, while the second channel 420 is carrying fluorescein dyed water 425. The clear water 415 and dyed water 425 merge in the merging region 435 before traveling downstream as a single merged fluid flow 460 within the merged downstream channel 440.

A graph 800 showing the measured fluorescence intensity of dye at a location $A_1$-$A_2$ within the merged downstream channel 440 is shown in FIG. 8. The graph 800 plots the cumulative brightness of the fluorescing dye in the merged downstream channel 440, relative to the input brightness within the upstream second channel 420, against the transverse location across the merged downstream channel 440. The brightness within the upstream second channel 420 is considered substantially 100% at all transverse locations.

As shown in FIG. 8, the integrated concentration of the dye within the merged downstream channel 440 varies across the width of the merged downstream channel 440, with a lower cumulative concentration being shown at the side of the channel 440 nearest to the incoming clear water 415 flow, and a higher cumulative concentration being shown at the side of the channel 440 nearest to the incoming dyed water 425 flow. This brightness profile 470 confirms the presence of the sigmoidal interface 450 shown in FIG. 6, with the dye concentration indicating the relative percentages of the clear water 415 and dyed water 425 across the width of the merged downstream channel 440.

In any of the above-described embodiments, the channels may be manufactured from silicone, metal, plastic, a composite material, and/or combinations thereof. In one embodiment, the flow channels upstream of the merging region have a cross section width and/or height of approximately 10 µm to 1000 µm. In an example embodiment, the flow channels upstream of the merging region have a cross-sectional area of approximately 100 µm by 500 µm, with a downstream cross-sectional area for the merged flow channel of approximately 200 µm by 500 µm. In alternative embodiments, any appropriate size and shape of channels may be utilized, as required.

In one embodiment of the invention, a flow rate for one or more channels is on the order of 100 microliters/minute. Alternatively, greater or smaller flow rates may be utilized.

The fluid flow channels may be manufactured by silicone molding or any other appropriate manufacturing method, such as, but not limited to, other types of molding, etching, and/or machining.

Figure 9:
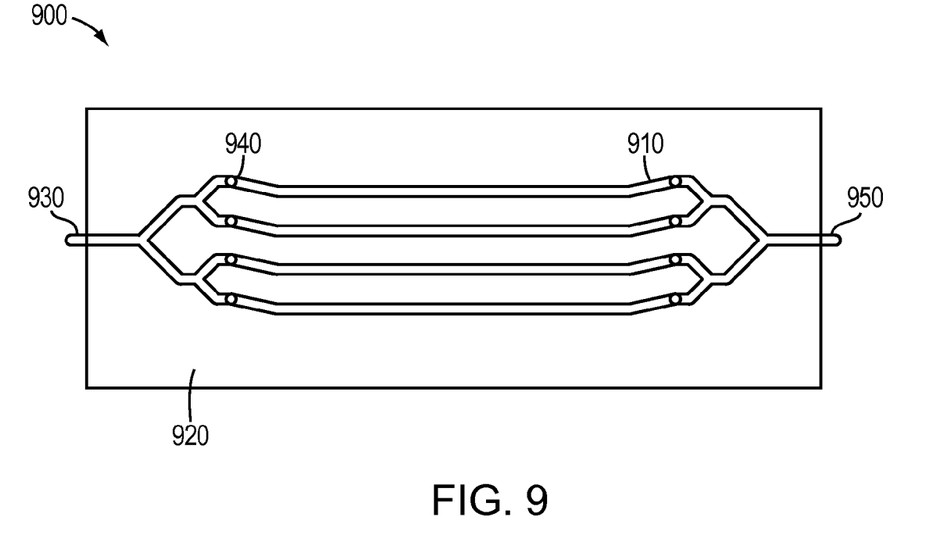
FIG. 9 is a schematic plan view of one half section of a device for forming intersecting flow streams, in accordance with one embodiment of the invention.
Figure 10:
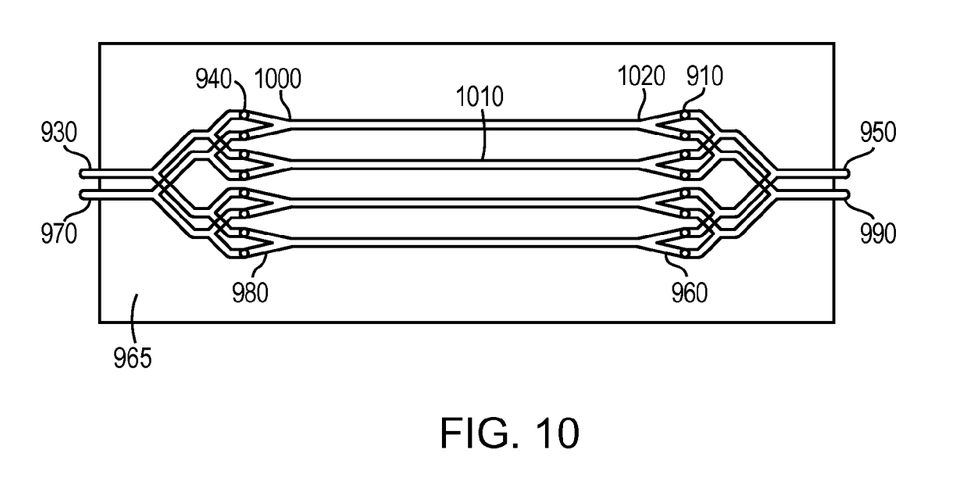
FIG. 10 is a schematic plan view of a device for forming intersecting flow streams including two half sections of FIG. 9 bonded face to face, in accordance with one embodiment of the invention.

An exemplary system 900 including a plurality of intersecting and separating channels is depicted in FIGS. 9 and 10. In this embodiment, a first channel structure 910 is manufactured within a first layer of material 920. This first channel structure 910 includes a first entrance channel 930 that is split into a plurality of channels leading to four first channel merging sections 940, with a first exit channel 950 recombining the fluid within each of the four merging sections 940 at a downstream location.

FIG. 10 shows a second channel structure 960, formed from a second layer of material 965 that is placed over the first channel structure 910. This second channel structure 960 includes a second entrance channel 970, four second channel merging sections 980, and a second exit channel 990. By placing the second channel structure 960 on top of the first channel structure 910, a plurality of merging regions 1000 are created. These merging regions 1000 each combine the fluid entering the system 900 through the first entrance channel 930 with the fluid entering the system 900 through the second entrance channel 970. The four first channel merging sections 940 and the four second channel merging sections 980, when placed one on top of the other, combine to form four merged stream channels 1010 with a substantially sigmoidal interface between the two fluids. These merged stream channels 1010 are then split into the first exit channel 950 and second exit channel 990 at diverging regions 1020.

The fluid flow channels in each of the first layer of material 920 and the second layer of material 965 may be manufactured by silicone molding or any other appropriate manufacturing method, such as, but not limited to, other types of molding, etching, and/or machining. As a result, any appropriate channel system may be created, including systems with a greater or lesser number of channels, and/or with the geometry of each channel configured, as described herein, to provide for any appropriate flow profile. In one embodiment, each channel includes the same geometrical structure, such as the same cross-sectional area and the same merging angles. In an alternative embodiment, different channels may include different geometries, allowing for each merged channel to provide a different downstream fluid flow profile.

In one embodiment, the first channel structure 910 and second channel structure 960 may be substantially identical, such that when the face of the first layer of material 920 is bonded to, or otherwise connected to, the face the second layer of material 965, they form the channel structure shown in FIG. 10. In an alternative embodiment the first channel structure 910 and second channel structure 960 are not substantially identical. The face of the first layer of material 920 can be connected to the face of second layer of material 965 through any appropriate bonding or mechanical means including, but not limited to, adhesive bonding, pressure bonding, heat bonding, or through one or more screw or bolt connections.

In another embodiment, the downstream flows 1010 need not be split and recombined into two exit channel 950, 990 flows. In other alternative embodiments, the downstream flows 1010 may be split and recombined into a greater or lesser number of exit channel flows. The flows within the merged stream channels 1010 may also be split in different ways, such as, but not limited to, along different orientations or into different fractions of the cross-sectional area, in order to produce exit flows including any required mix of the first and second fluid.

An example device 1300 including two merging regions, with one diverging region between them, is shown in FIG. 11. In this embodiment, the device 1300 includes a first channel 1310 carrying a first fluid and a second channel 1320 carrying a second fluid. The first channel 1310 and second channel 1320 lie within two separate, substantially parallel planes, as described with reference to the embodiments depicted in FIGS. 3A-8. The first channel 1310 and second channel 1320 each extend at an angle $\theta$ to a central longitudinal axis 1330.

The first channel 1310 and second channel 1320 merge into a single merged downstream channel 1340 at a merging region 1335, with the merged downstream channel 1340 extending along the direction of the longitudinal axis 1330. As described above, a cross-section of the fluid flow in the downstream merged channel 1340 may include a separate region of each of the first fluid and the second fluid, with a substantially sigmoidal fluid interface therebetween.

In one embodiment of the invention, the merged downstream flow may be split at a downstream location to produce two or more fluid flows, each with differing ratios of the first fluid and second fluid depending upon the orientation and configuration of the split. This diverging region 1350 splits the merged fluid flow into two separate substream flows, with the resulting substream flows extending out from the diverging region 1350 along two separate parallel planes. In one embodiment, the diverging region 1350 can be configured to be substantially a mirror image of the merging region 1335. In other words, the diverging region may be configured with substantially the same shape as the diverging region 1350, but with the flow direction reversed such that a single flow, i.e. the flow within the downstream merged channel 1340, is split into two substreams 1360, 1370 lying within two separate, substantially parallel planes. Alternatively, the diverging region 1350 may be configured in any appropriate in-plane or out-of-plane configuration, and may lead to a plurality of split substream flows of equal or varying cross-sectional areas, as required.

In the embodiment depicted in FIG. 11, the downstream fluid flow is split at a diverging region 1350 into a first substream 1360 and a second substream 1370. Due to the sigmoidally shaped fluid interface between the two fluids in the merged downstream flow 1340, when the merged downstream flow 1340 is split, the resulting first substream 1360 and second substream 1370 will carry different ratios of the first fluid and second fluid. The specific ratio of each fluid in each of the first substream 1360 and second substream 1370 depends upon the specific orientation and configuration of the diverging region 1350. Alternatively, the diverging region 1350 may split the flow into a greater number of substreams, each carrying a different ratio of the first fluid and second fluid.

The first substream 1360 and second substream 1370 are then recombined at a second merging region 1380 into a second merged downstream channel 1390. This second merged downstream channel 1390 combines the flows within the first substream 1360 and second substream 1370, which each lie within two separate, substantially parallel planes, in the manner described with reference to the embodiments depicted in FIGS. 3A-8. By repeatedly splitting and merging two fluid flows in two substantially parallel planes, the two separate fluids are, in one embodiment, combined to produce a uniformly mixed flow.

In alternative embodiments, this second merging region 1380 is configured in the form of any of the merging regions described herein. By recombining the fluid flow within the first substream 1360 and second substream 1370, a combined fluid flow with any appropriate cross-sectional distribution of the first fluid and second fluid may be obtained. In an alternative embodiment, different combinations of merging and diverging sections produce partially mixed fluid flows.

At least one of the substreams 1360, 1370 may include one or more mixing device. This mixing device may mix the two fluids within the substream flow to produce a uniform flow with the ratio of each fluid within the mixed flow determined by the ratios of each fluid entering each substream 1360, 1370 at the diverging region 1350. The mixing device may include any appropriate laminar flow mixer for use in microfluidic flow channels. For example, the mixing device may include one or more static mixing elements placed within the substream flow to disrupt the laminar flow and induce mixing of the fluids. Alternatively, any appropriate static or dynamic mechanical mixing device may be used to mix the two fluids within each substream 1360, 1370.

Any number of merging regions and diverging regions may be incorporated into a channel system to produce a variety of fluid flows with appropriate cross-sectional distributions of two or more fluids. One embodiment of the invention includes producing a large number of output flows, each with a different ratio of a first and second fluid, by providing a diverging region with multiple substreams. Another embodiment includes introducing additional fluid flows including a third fluid at a second merging region, downstream of the first merging region, to result in one or more output flows incorporating three or more fluids. Another embodiment includes a merging region in which three or more fluids are merged at one time. Any appropriate mixture or input flow channels, merging regions, diverging regions, and output flow channels may be incorporated into a channel system, with the merging regions and/or diverging regions configured in any of the forms described herein.

Another example embodiment of a system including both merging regions and downstream diverging regions is depicted in FIG. 12A-12E. In this embodiment, a device 1400 includes a first channel 1410 carrying a first fluid 1415 and a second channel 1420 carrying a second fluid 1425. The first channel 1410 and second channel 1420 lie within two separate, substantially parallel planes. The first channel 1410 extends at an angle α to a central longitudinal axis 1430, while the second channel 1420 extends at an angle θ from the central longitudinal axis 1430. FIG. 12B shows a cross-sectional view of the first channel 1410 and second channel 1420 at a location A-A upstream of a merging region 1435, with the first channel 1410 second channel 1420 lying within two separate, substantially parallel planes. As can be seen, the first channel 1410 transports a first fluid 1415, and the second channel 1420 transports a second fluid 1425, into the merging region 1435.

In this embodiment, the first channel 1410 and second channel 1420 merge into a single merged downstream channel 1440 at the merging region 1435, with the merged downstream channel 1440 extending along the direction of the longitudinal axis 1430. The first channel 1410, second channel 1420, and merged downstream channel 1440 may include any of the elements and configurations described herein. For example, in one embodiment of the invention, the cross-sectional area of the merged downstream channel 1440 is equal to the combined cross-sectional area of the first channel 1410 and second channel 1420. FIG. 12C shows a cross-sectional view of the merged downstream channel 1440 at a location B-B. As shown, after the first fluid 1415 and the second fluid 1425 have merged within the merging region 1435, the two fluids will continue downstream with a substantially unmixed laminar flow, with a substantially sigmoidally shaped fluid interface 1455 therebetween.

At a set location downstream, the merged downstream channel 1440 enters a diverging region 1450, wherein the single merged channel 1440 is split into three separate substreams, a first substream 1460, a second substream 1470, and a third substream 1480, all in the same plane. In an alternative embodiment, the flow may be split into a greater or lesser number of substreams.

Due to the substantially sigmoidal fluid interface between the first fluid 1415 and the second fluid 1425, the fluid flow within the first substream 1460, second substream 1470, and third substream 1480 will each have a different ratio of the two fluids. More specifically, the first substream 1460 will carry more of the first fluid 1415 than the second fluid 1425, the second substream 1470 will carry substantially an equal amount of each fluid, and substream 1480 will carry a greater amount of the second fluid 1425 than the first fluid 1415.

In one embodiment of the invention, the first substream 1460, second substream 1470, and third substream 1480 channels include one or more mixing elements for mixing the two fluids within that channel to produce a substantially homogeneous mix of the two fluids, with the ratio of each fluid within the mix determined by the ratio of each fluid entering that substream channel at the diverging region 1450. In an alternative embodiment, only one or some of the substream channels 1460, 1470, 1480 include a mixing element.

FIG. 12D shows a cross-sectional view of the first substream 1460, second substream 1470, and third substream 1480 at a location C-C downstream of the diverging region 1450, with the different ratios of the first and second fluids indicated.

The three substreams 1460, 1470, 1480 may, in one embodiment, be recombined at a second merging region 1490 into a second downstream merged channel 1495. By splitting the fluid flow within the single merged channel 1440, mixing the split fluid flows within each of the plurality of substreams 1460, 1470, 1480, and then recombining the split and mixed substream flows in a second merged channel 1495, a fluid flow with a substantially linear fluid concentration gradient from one side of the second downstream merged channel 1495 to the other may be created. A cross-section of an example fluid flow with a substantially smooth fluid concentration gradient across its width is depicted in FIG. 12E. In one embodiment, this concentration gradient is substantially linear.

In an alternative embodiment, the plurality of substreams 1460, 1470, 1480 need not be recombined at the second merging region 1490, but may rather remain as separate substreams. As a result, the device 1400 may provide a plurality of output flows, each with a specific, different, mixture of two or more fluids. This may be of use in a number of fields, such as, but not limited to, medical analysis and/or treatment and chemical processing. In another alternative embodiment, one or more of the substreams 1460, 1470, 1480 may be split into multiple flow channels. In further alternative embodiments, the plurality of substreams 1460, 1470, 1480 may be split and/or recombined, in whole or in part, in any appropriate combination, allowing for a variety of outputs from the device 1400 including different mixtures of fluids with different cross-sectional flow profiles.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A device for combining a plurality of flow streams, comprising:
    a merging portion comprising: (i) a first merging channel for transporting a first laminar fluid flow; (ii) a second merging channel for transporting a second laminar fluid flow, an upper surface of the second merging channel and a lower surface of the first merging channel lying on a single central plane; (iii) a merging region having a central axis lying along the central plane; and (iv) a single merged downstream channel, wherein the first and second merging channels enter the merging region at an acute angle to one another along adjacent planes substantially parallel with the central plane; and
    a diverging portion comprising a plurality of diverging substream channels extending from the merged downstream channel, each diverging substream channel for transporting a different ratio of the first laminar fluid and second laminar fluid.

2. The device of claim 1, wherein the device produces a sigmoidal interface between two merged fluid flows in the merged downstream channel.

3. The device of claim 1, wherein at least one of the channels comprises or consists essentially of a material selected from the group consisting of a silicone, a metal, a plastic, a composite material, a glass, and combinations thereof.

4. The device of claim 1, wherein at least one of the channels is manufactured by polymer molding.

5. The device of claim 1, wherein the first and second merging channels each comprise a substantially equal cross-sectional area.

6. The device of claim 1, wherein the device comprises a plurality of material layers, at least one of the material layers comprising at least one open channel.

7. The device of claim 1, wherein the merged downstream channel comprises a cross-sectional area substantially equal to a combined cross-sectional area of the first and second merging channels.

8. The device of claim 1, further comprising a third merging channel for transporting a third laminar fluid flow, the third channel entering the merging region at an acute angle to at least one of the first and second channels along a separate plane.

9. The device of claim 1, wherein at least two of the plurality of diverging substream channels extend outward within a single plane.

10. The device of claim 1, wherein at least two of the plurality of diverging substream channels extend outward at an acute angle to one another along separate substantially parallel adjacent planes.

11. The device of claim 1, further comprising a plurality of merging portions and diverging portions positioned in series along a fluid flow path.

12. The device of claim 1, wherein at least one diverging substream channel comprises a mixing device.

13. The device of claim 1, wherein the plurality of diverging substream channels enter a second merging region at an acute angle to one another.

14. The device of claim 13, wherein the second merging region generates a substantially smooth concentration gradient between the first laminar fluid flow and the second laminar fluid flow.

* * * * *